July 18, 1939. N. T. BALDANZA 2,166,110

SPECTACLES

Filed May 21, 1938

INVENTOR.
Nicholas T. Baldanza
BY
M. Lee Helms
ATTORNEY.

Patented July 18, 1939

2,166,110

UNITED STATES PATENT OFFICE 2,166,110

SPECTACLES

Nicholas T. Baldanza, Passaic, N. J.

Application May 21, 1938, Serial No. 209,265

5 Claims. (Cl. 2—13)

The present invention relates to spectacles, goggles, and the like, and has for its primary object the provision of a spectacle or the like having temple portions serving as a spectacle case.

A still further object of the invention is to locate the two portions of the case at the frame extremities so as to effectively shade the eyes against side glare, the portions of the spectacle case serving as temple bars.

Another object of the invention is to locate the two portions of the case so that the extremities adjacent to the spectacle frame serve as mountings for the templer pivots, or hinges for the spectacle frame.

A further object of the invention resides in the provision of a device of the character mentioned that is light in weight, and simple and inexpensive to manufacture by modern plastic molding methods.

Other objects and advantages of the invention will be apparent by reference to the detailed description thereof when read in connection with the accompanying drawing which forms part of this specification.

Figure 1:
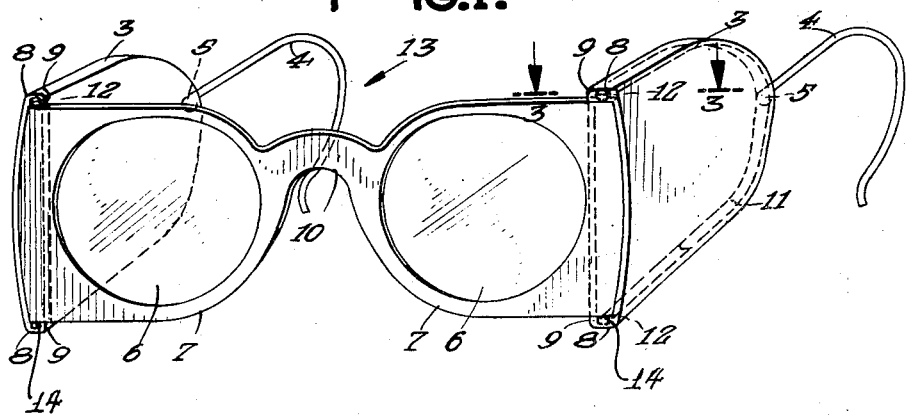
Fig. 1 is a perspective view of a structure embodying the present invention, and open ready for use.

Referring to the drawing for a more detailed description thereof, the numeral 13 indicates generally the spectacle assembly comprising temple portions 3 which, in accordance with the present invention, also serve as a case or receptacle for the primary elements of the spectacle. It will be noted that in use the members 3 extend at right angles to the lenses 6 and since they are preferably formed of colored filtering material, will eliminate eye strain due to side lighting. Temple bars 4 are pivoted at 5 to the portions 3 as clearly indicated in the drawing, the bars 4 being positioned over the ears to support the spectacle in the well known manner.

The lenses 6 are contained in a conventional type frame 7 having a nose bridge 10. The exterior portions of the frame 7 are substantially rectangular at their ends and each corner of said portions are formed with pin-like extensions 12 which serve the dual purpose of guiding the spectacle frame 7 within the portions 3 and to act as pivots to enable locating the spectacle frame 7 at a right angle to the portions 3. Stops 14 are provided at the open ends of members 3 for limiting the travel of the pivot extensions 12.

One wall of each said member 3 is cut away at 9 so that the edge of the wall will abut the inner-face of the spectacle member 10 when the parts are moved open to the position of Figure 1. As illustrated in Fig. 1 of the drawing, outer recesses 11 are formed in the portions 3 to provide a space for the temple bars 4 when the spectacle is not being worn.

Figure 2:
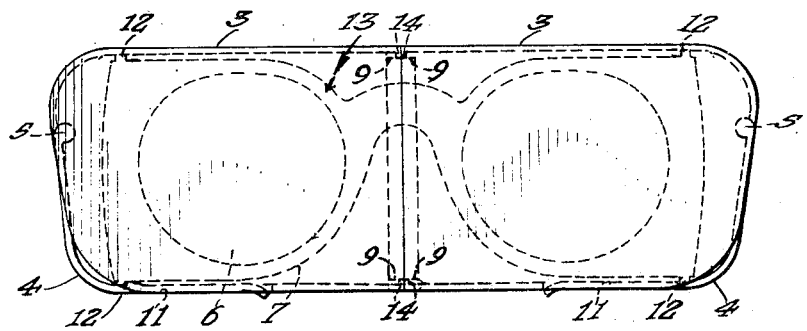
Fig. 2 is a front elevational view of the spectacle case with the eyeglass frame and temple bars contained therein.
Figure 3:
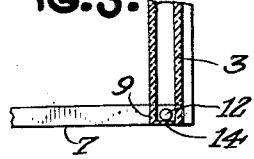
Fig. 3 is a fragmentary horizontal section on the line 3—3, Fig. 1.

When the eyeglasses or spectacles are worn, the side portions 3 and temple bars 4 are in the position illustrated in Fig. 1 of the drawing. When desiring to fit the parts together to form the combination case and spectacle illustrated in Fig. 2, the case portions 3 at each side of the spectacle are rotated essentially 90° into alignment with the spectacle frame 7. This rotation is accomplished about the pivot extensions 12. As understood, the ends 8 of the portions 3 are open and each lens and its supporting frame is then inserted into the adjacent portion 3. The temple bars 4 are then swung into the recesses 11 and the case and spectacle may be carried in the pocket without danger of breaking the lenses.

It is to be understood that the portions 3 may be constructed of material capable of filtering various colors of light so as to eliminate eye strain. In order to reduce the overall weight and dimensions of the portions 3, it is advisable to construct the spectacle so that the overall thickness is kept at a minimum.

It is to be understood that this improvement is capable of extended application and is not confined to the exact showing of the drawing nor to the precise construction described, and therefore, such changes and modifications may be made therein as do not affect the spirit of the invention nor exceed the scope thereof as expressed in the appended claims.

What is claimed is:

1. In a device of the character described, the combination of a spectacle frame and a pair of templers attached thereto, said templers consisting of compartments pivotally connected to the extremities of said spectacle frame and adapted to be swung in line with the frame and thence into substantial line abutment to enclose the frame.

2. In a device of the character described, the combination of a spectacle frame, a pair of transparent lenses in said frame, templers pivotally connected to said frame and comprising compartments with temple bar extensions, said templer compartments being pivotally movable into alignment with the spectacle frame and thence being movable toward each other to enclose the frame.

3. In a device of the character described, the combination of a spectacle frame, a pair of transparent lenses in said frame, templers attached to said frame comprising compartments pivotally connected to the extremities of said frame, and movable into positions at right angles with said frame and also in line with the frame and thence longitudinally of the frame to enclose the same.

4. In a device of the character described, the combination of a spectacle frame, frame-receiving compartments attached to the extremities of said spectacle frame and pivotally connected thereto, temple bars pivotally connected to the other extremities of the compartments, and abutment means for stopping said compartments essentially at a right angle to said spectacle frame.

5. In a device of the character described, the combination of a spectacle frame, frame-receiving compartments attached to extremities of said spectacle frame and pivotally connected thereto, temple bars pivotally connected to the other extremities of said compartments, and means for stopping said compartments essentially at right angles to said spectacle frame.

NICHOLAS T. BALDANZA.